United States Patent [19]

Priore

[11] Patent Number: 4,970,749
[45] Date of Patent: Nov. 20, 1990

[54] FROST SCRAPER WITH HAND OPENING

[76] Inventor: Philip A. Priore, 78 Preston St., Windsor, Conn. 06095

[21] Appl. No.: 349,592

[22] Filed: May 9, 1989

[51] Int. Cl.$^5$ ............................ B60S 1/04; A47L 1/06
[52] U.S. Cl. .............................. 15/236.02; 15/104 S; 15/245; 30/169
[58] Field of Search ............ 15/104 S, 236.01, 236.02, 15/236.08, 245; 30/169

[56] References Cited

U.S. PATENT DOCUMENTS

| | | | |
|---|---|---|---|
| 1,192,910 | 8/1916 | Lawrence | 30/169 |
| 1,927,350 | 9/1933 | Schopp | 15/122 |
| 2,275,713 | 3/1942 | Ahlborg | 15/236.02 |
| 2,299,089 | 10/1942 | Haan | 15/236 |
| 2,532,429 | 12/1950 | Sparkman | 15/136 |
| 2,611,146 | 9/1952 | Buckley | 15/210 |
| 2,880,505 | 4/1959 | Geery | 30/169 |
| 3,133,301 | 5/1964 | Helminen | 15/245 |
| 3,408,677 | 11/1968 | Yates | 15/236.02 |
| 3,865,370 | 2/1975 | Rogers | 30/169 |
| 4,155,142 | 5/1979 | Demetriadis | 15/236.08 |
| 4,418,439 | 12/1983 | Porchet | 15/236.02 |
| 4,802,280 | 2/1989 | Lapiana | 30/169 |
| 4,813,458 | 3/1989 | Jacobucci | 15/236.08 |

FOREIGN PATENT DOCUMENTS

| | | | |
|---|---|---|---|
| 924051 | 2/1955 | Fed. Rep. of Germany | 15/245 |
| 212713 | 2/1923 | United Kingdom | 30/169 |

*Primary Examiner*—Harvey C. Hornsby
*Assistant Examiner*—Mark Spisich
*Attorney, Agent, or Firm*—Chilton, Alix & Van Kirk

[57] ABSTRACT

A unitary, substantially flat scraper (10,20,30,40) having a handle portion (11,21,31,41,42) adapted to be grasped with one or two hands through an opening (13,25,33,44) for the fingers, and a wide blade portion (12,22,32,43) which is semi rigid so as to conform to the curvature of the surface to be scraped, as the user strokes the scraper.

15 Claims, 1 Drawing Sheet

FROST SCRAPER WITH HAND OPENING

BACKGROUND OF THE INVENTION

The present invention relates to hand held apparatus for removing accumulations of frozen material, and more particularly, to the removal of frost from windows or the like.

Hand held devices for the removal of ice from the windshield and other windows of automobiles and other vehicles are commonly sold in retail stores and automobile service stations. Such scrapers typically have a handle portion that is adapted to be grasped in one hand, and extend in a direction generally parallel to the user's arm and perpendicularly or transversely to the surface to be scraped. A rigid blade portion extends from the handle portion and includes an integrally formed or separately attached edge for contacting and scraping the ice. Such scrapers are designed for the removal of ice, but are also used for the removal of frost.

The rugged construction and need for concentrating the user's applied force to the task of removing ice, dictates that the contact edge of the blade portion have a width on the order of only a few inches. Similarly, the blade and in particular the edge, are rigid so as to withstand the high applied forces, which sometimes include very highly concentrated impacted forces when the scraper is used as chisel.

In many parts of the country, weather patterns during several months of the year before and after winter, produce frost conditions that require scraping. The ice scrapers of the type described above, are not well suited for this purpose. The rigid blade does not conform closely to the subtle curvature of most windows, and the edge of such scrapers typically has nicks or other irregularities. These characteristics are of little adverse consequence with respect to the removal of ice, but result in excessive effort and frustration with respect to the removal of frost. The narrow edge requires many strokes by the user to clean all the windows, even though little force may be required. The rigidity and irregularities of the edge result in leaving streaks of unremoved frost behind the path of the blade as it is stroked.

SUMMARY OF THE INVENTION

It is an object of the present invention to provide a device adapted for removing frost more efficiently than conventional ice scrapers.

This object is accomplished in accordance with the invention with a unitary, substantially flat scraper having a handle portion adapted to be grasped with one or two hands through an opening for the fingers, and a wide blade portion which is semi-rigid so that the active edge of the blade conforms to the curvature of the surface to be scraped, as the user strokes the scraper.

Various embodiments of the invention can be produced with the handle portion in polygonal, semicircular, and triangular shapes.

BRIEF DESCRIPTION OF THE DRAWINGS

The preferred embodiment of the invention will be described below with reference to the accompanying drawings, in which.

DESCRIPTION OF THE PREFERRED EMBODIMENT

Figure 1:
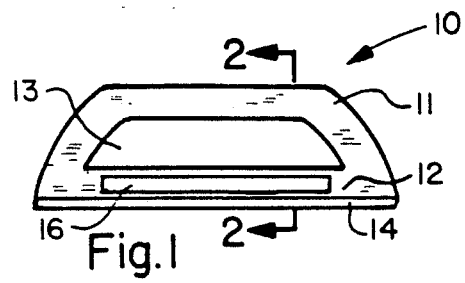
FIG. 1 is a plan view of a first embodiment of the scraper in accordance with the invention, having a "C" shaped handle.
Figure 2:
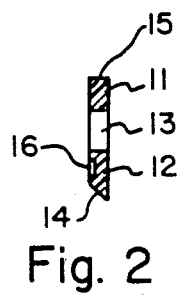
FIG. 2 is a section view along line 2—2 of FIG. 1.

FIGS. 1 and 2 show a frost scraper 10 having a handle portion 11 connected at its lateral ends to a straight blade portion 12 in a manner that defines an opening 13 therebetween. The handle 11 and opening 13 are sized so that an adult can insert the fingers of one and preferably two hands through the opening 13 and grasp the handle 11 firmly to advance the blade 12 along the surface to be cleaned (not shown). The blade 12 has a leading or active edge 14 that is wider than found on hand held ice scrapers, i.e., in the range of about 7–15 inches and preferably about 9–12 inches. Preferably, the longitudinal dimension of the handle and the opening are parallel to the longitudinal dimension of the blade 12, and to the surface to be scraped.

The scraper 10 is most easily manufactured as a flat, planar member, from styrene, vinyl, or other material which has semi rigid properties at the active edge 14 so as to conform with subtle curvatures in the surface to be scraped. Styrene scrapers in accordance with the invention would typically have a thickness in the range of about 0.05–0.15 inch, whereas vinyl scrapers would have a thickness in the range of about 0.10 to 0.25 inch. The relationship of blade thickness to leading edge width should permit an average adult, while graping the scraper by the handle 11 with both hands and exerting moderate force, to produce a bend in the edge 14 with a radius of curvature that is in the range of between about one and three times the width of the edge.

The handle 11 shown in FIGS. 1 and 2 is substantially in the shape of a "C", with the dimension between the handle top edge 15 and the blade active edge 14, being less than the width of blade edge 14. The width of blade edge 14 is greater than that of conventional ice scrapers, and coupled with the semi rigid bending characteristic, is much superior to ice scrapers in removing frost over a wider area per stroke, while avoiding streaking.

The active edge 14 can be profiled, such as the bevel shown in FIG. 2, but this is not usually necessary so long as the portion of the active edge for contacting the frosted surface is sharply cornered.

The opening 13 should preferably have a maximum dimension from blade 12 to handle 11 of at least about three inches, and a maximum dimension in the width direction of the blade, of at least about six inches to accommodate gloved fingers. Although satisfactory scrapers in accordance with the invention can have the opening 13 sized for only one hand, the preferred scraper opening permits usage with either one or both hands. Use with one hand is advantageous when a long reach is necessary, such as for scraping the central portion of an automobile windshield. The exact shape of the handle 11 is not critical, but it is preferred that a portion of the hands be turned slightly inward relative to the stroke direction, to promote a slight bending of the active edge 14 while following curved surfaces.

A recess 16 or bordered area or the like may be provided on the blade 12 or handle 11, for receiving labels or to serve as a specially prepared surface receptive to printing, so that advertising or identification information can be placed thereon.

Figure 3:
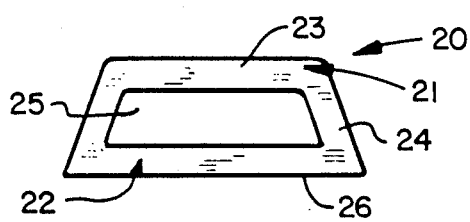
FIG. 3 is a plan view of a second embodiment of the invention, having a polygonal handle.

FIG. 3 shows an alternative embodiment of the scraper 20 wherein the handle 21 has a substantially straight top strip 23 in parallel with the straight blade 22, and two spaced apart side strips 24 connecting the top strip 23 to the blade 22. The inner edges of the top strip 23, blade 22, and side strips 24 define the polygonal opening 25, for permitting insertion of the fingers of two hands to grasp the handle 21. The active edge 26 of the blade is similar to edge 14 shown in FIG. 1. As shown in this and the other illustrated embodiments, the blade active edge is longer than each side strip.

Figure 4:
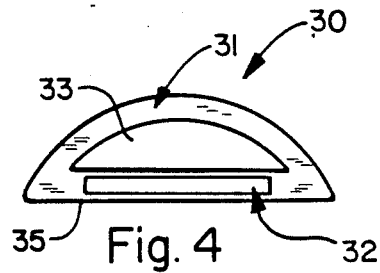
FIG. 4 is a plan view of a third embodiment of the invention, having a semicircular handle.

FIG. 4 shows another embodiment 30 wherein the handle 31 is substantially in the form of an semicircular segment centered at the midpoint of blade 32, thereby defining opening 33.

Figure 5:
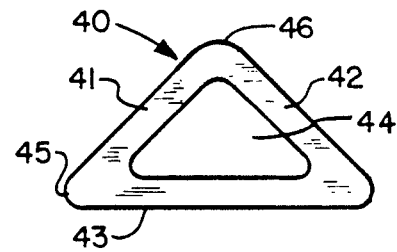
FIG. 5 is a plan view of a fourth embodiment of the invention, having an overall triangular shape.

FIG. 5 shows another, triangular embodiment 40 in which the handle consists of legs 41,42 of equal length, and the blade consists of the long leg 43. In the embodiment of FIG. 5, the corners 45 at the ends of the blade 43 are optionally rounded more than shown in FIGS. 1 and 4. Similarly, corner 46 in the triangular embodiment is preferably rounded. In the context of the present invention, the term rounded means any blunting of sharp corners. This avoids digging of the scraper into moldings and window seals, and chipping of the scraper or damage to other objects with which the scraper may be stored or carried.

Figure 6:
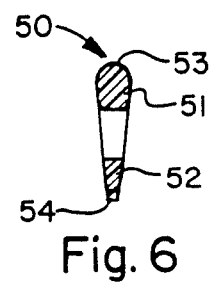
FIG. 6 is a section view similar to FIG. 2, showing an alternative embodiment wherein the thickness of the scraper tapers from the handle toward the blade.

FIG. 6 shows a variation which may be implemented with any of the embodiments described above, wherein the thickness of the scraper 50 tapers downwardly from the handle 51 to the blade 52, and more particularly, from the top edge 53 to the active edge 54. This shape is not strictly flat, but is substantially flat or planar as the term is used herein. This combines high rigidity in the handle, with sufficient flexibility at the active edge 54, for adequately following the contours of the frosted surface.

It should be appreciated that the present invention is well suited for scraping frost from windows of all kinds, and especially the windows on automobiles, vans, trucks, or even aircraft. The unusually wide swath and the ability to conform to the curved surfaces of most such windows, permits completion of the defrosting task in considerably less time than is possible with conventional ice scrapers.

I claim:

1. A frost scraper for removing frost from a curved windshield surface, consisting of a thin, substantially planar, unitary body having a handle portion and a straight blade portion spaced apart such that a single opening is formed within and between the handle portion and the blade portion and being of a size so that the fingers of both hands of an adult can be inserted simultaneously around the handle portion and through the opening to grasp the handle and stroke the scraper blade in a direction along the windshield surface, said handle portion and said opening each having a longitudinal dimension substantially parallel to the blade portion, whereby the blade is bendable transversely to the stroked direction while grasped with both hands so that the blade active edge conforms to the curvature of the windshield as the blade is stroked across the surface with both hands.

2. The scraper of claim 1, wherein the scraper has the general shape of a "D" and the handle portion has the general shape of a "C", with the blade portion extending between the extremities of the handle portion.

3. The scraper of claim 1, wherein the handle portion includes a top strip spaced from and parallel to the blade portion and two spaced-apart side strips connected between the top strip and blade portion, the blade active edge being longer than each side strip, said spaces between the top strip and blade, and between the side strips, defining the opening for the fingers of both hands.

4. The scraper of claim 1, wherein the handle portion is in the shape of a semicircular segment centered on a line passing substantially through the midpoint of the blade portion.

5. The scraper of claim 1, wherein the handle and blade define an isosceles triangle in which the blade constitutes the longest leg.

6. The scraper of claim 1, wherein the active edge is profiled.

7. The scraper of claim 6, wherein the profiled edge is bevelled.

8. The scraper of claim 1, wherein the blade portion has longitudinal ends, and said ends are rounded.

9. The scraper of claim 5, wherein each outer corner of the triangle is rounded.

10. The scraper of claim 1, wherein the active edge of the blade portion is at least of about nine inches in length, and the maximum dimension of the scraper in a direction transverse to the blade active edge is less than nine inches.

11. The scraper of claim 1, wherein the scraper is sufficiently semi rigid whereby with said two hands on the handle portion the user can produce a bend in the blade portion with a radius of curvature of between about one and three times the width of the blade active edge.

12. The scraper of claim 1, wherein the scraper is made from styrene and has a thickness at the blade active edge of between about 0.05 and 0.15 inch.

13. The scraper of claim 1, wherein the scraper is made from a vinyl material and has a thickness at the blade active edge of between about 0.10 and 0.25 inch.

14. The scraper of claim 1, wherein the handle portion is thicker than the blade portion.

15. The scraper of claim 14, wherein the thickness of the scraper tapers downward from the handle portion toward the active edge of the blade.

* * * * *